United States Patent [19]

Gentry et al.

[11] Patent Number: 5,740,448
[45] Date of Patent: Apr. 14, 1998

[54] METHOD AND APPARATUS FOR EXCLUSIVE ACCESS TO SHARED DATA STRUCTURES THROUGH INDEX REFERENCED BUFFERS

[75] Inventors: Denton E. Gentry, Palo Alto; Prakash Kashyap, Fremont, both of Calif.

[73] Assignee: Sun Microsystems, Inc., Mountain View, Calif.

[21] Appl. No.: 499,483

[22] Filed: Jul. 7, 1995

[51] Int. Cl.$^6$ .................................................. G06F 13/00
[52] U.S. Cl. .................... 395/726; 395/468; 395/608; 395/736; 395/457; 370/85.1
[58] Field of Search ........................ 395/726, 200.08, 395/200, 250, 735, 325, 675, 676, 601, 603, 375, 468, 736; 370/85.1; 371/57.1; 364/200

[56] References Cited

U.S. PATENT DOCUMENTS

| | | | |
|---|---|---|---|
| 4,833,603 | 5/1989 | Morganti et al. | 364/200 |
| 5,136,582 | 8/1992 | Firoozmand | 370/85.1 |
| 5,299,313 | 3/1994 | Petersen et al. | 395/200 |
| 5,303,347 | 4/1994 | Gagne et al. | 395/250 |
| 5,307,459 | 4/1994 | Petersen et al. | 395/200 |
| 5,392,406 | 2/1995 | Petersen et al. | 395/325 |
| 5,434,872 | 7/1995 | Petersen et al. | 371/57.1 |
| 5,438,677 | 8/1995 | Adam et al. | 395/736 |
| 5,530,874 | 6/1996 | Emery et al. | 395/735 |
| 5,608,893 | 3/1997 | Slingwine et al. | 395/468 |

*Primary Examiner*—Jack B. Harvey
*Assistant Examiner*—Eric Thlang
*Attorney, Agent, or Firm*—Blakely Sokoloff Taylor & Zafman

[57] ABSTRACT

A method and an apparatus for hardware and software interaction in data transfers of shared data structures in memory. The method and apparatus decreases the number of mutex lockings required to prevent conflict between different software attempting to access the same data and keeps the index value for each buffer in use in order to prevent conflicts between buffer replacement and packet arrival. In an exemplary implementation of the method and apparatus of the present invention, a receive hardware of a computer system keeps an index value for each buffer in use. This index value is placed in a completion ring protected by a mutex, and placed in a software queue protected by mutex. The mutexes assure that only one thread will possess a given index at a given time. No mutex locking is required for a buffer table containing software address and related information.

12 Claims, 8 Drawing Sheets

METHOD AND APPARATUS FOR EXCLUSIVE ACCESS TO SHARED DATA STRUCTURES THROUGH INDEX REFERENCED BUFFERS

BACKGROUND OF THE INVENTION

(1) Field of the Invention

The present invention is related to the field of hardware and software interaction with shared data structures in computer systems. More specifically, the method and apparatus of the present invention is related to indexing buffer addresses for shared data structures to improve overall system performance.

(2) Prior Art

Memory as related to a computer is typically all of the addressable storage space in a processing unit and other internal storage that is used to execute instructions. It is well known that computer systems as well as other "intelligent" systems include host memory. Typically, host memory includes a number of data buffers of an arbitrary byte size residing with fit a predetermined address range. These data buffers are uniquely addressed within the predetermined address range to allow selective access to data for subsequent processing or transmission. Data buffers may be arranged in a circular ordering as part of a buffer ring in memory.

FIG. 1 illustrates an exemplary implementation of prior art method for managing data transfers of shared data structures by using numerous mutex lockings. Descriptor ring 100 is capable of having one or more buffers 102. Buffer table 104 lists buffer information including buffer addresses. Completion ring 106 is also capable of having one or more buffers.

Mutex 1, 2 and 3 are routines ensuring that at a given time, only one asynchronous procedure may access the same shared variable or execute members of a group of critical sections. More specifically, mutex refers to a concept of mutual exclusion. As used herein, it refers to a routine which only allows one software application from attempting to access and use the descriptor ring and the buffer table at any one time. There is also a routine which will automatically grab the mutex in allowing an application to acquire a mutex lock. The mutex lock keeps different threads from choosing the same location, whether it be in the buffer table or the descriptor ring.

In an exemplary embodiment of a prior art method and apparatus, the software is typically capable of queuing up a number of buffer addresses on descriptor ring 100 for hardware use. The hardware reads from descriptor ring 100 to retrieve a buffer address. The hardware may then write back to descriptor ring 100 and clear a bit which lets the software know it has picked up the buffer address. When the hardware has finished processing a packet, it places the descriptor on completion ring 106.

Address A for buffer A 102 is an address which the hardware uses to access buffer A 102 and to DMA (direct memory access) data into it. The software cannot utilize this address since this address exists only on the I/O bus. Thus, the software may use buffer table 104 listing the I/O address as well as the corresponding kernel address to get from an address A to the buffer information it needs. In order to place the buffer address on descriptor ring 100, the software must mutex lock descriptor ring 100 and buffer table 104 disallowing any other software from attempting to access the same address of descriptor ring 100 and buffer table 104 at the same time.

Once the software has updated buffer table 104 and has placed the buffer on descriptor ring 100, the software gives up both mutexes. The hardware then picks up the buffer, DMA's necessary data into it and places it on completion ring 106 and may initiate an interrupt. The software then acquires a mutex 3 for completion ring 106 and a mutex 2 again for buffer table 104. The software takes buffer A 102 off completion ring 106, searches for buffer A address in buffer table 104, retrieves the required information from buffer table 104 and processes the data in the buffer as is desired.

Thus, the prior art method and apparatus uses a multi-threaded device driver which may have several threads of execution attempting to access shared data structures. In order to prevent contention, the shared data structures are protected by mutex to serialize thread accesses. A disadvantage of the prior art method and apparatus is that serialization harms overall system performance. In other words, by using the method and apparatus of the prior art, a software application must acquire a mutex for the descriptor ring and acquire another mutex for the buffer table in order to place a buffer on the descriptor ring for the hardware to use.

FIG. 2 is a flow diagram illustrating the general steps which may be followed by the prior art method and apparatus for data packet transfers involving rings and buffer tables as illustrated in FIG. 1. In step 201, a software application acquires mutex 1 and mutex 2. Mutex's are "acquired" when mutex lockings are made to restrict access to, for example, a descriptor ring or a buffer table to only one software application. In step 202, the software updates the buffer table with information for buffer A and places buffer A on the descriptor ring.

In step 203, a data packet arrives. In step 204, hardware, such as a control RAM internal to a circuit of a computer system DMA's the data packet into buffer A and places A on the completion ring. In step 205, the software acquires mutex 2 and mutex 3. In step 206, the software must hash the buffer table in order to locate buffer A in the buffer table.

There are many disadvantages with the method and apparatus of the prior art. For example, in order to queue up a buffer, the software needs mutex 1 and mutex 2. In order to free up a buffer, the software needs mutex 2 and mutex 3. Thus, one disadvantage is that the two operations create a conflict over mutex 2 which limits the overall system performance. A second disadvantage is that a particular buffer A may be anywhere in the buffer table. Thus, it is necessary to hash and search for buffer A. Thirdly, when hashing, it is necessary to detect a "hit." For example, in order to hash A into the buffer table, it is necessary to store A in the buffer table to detect the hit. Thus, the method and apparatus of the prior art requires this additional memory space in order to store A in the buffer table.

It is therefore desirable to have a method and an apparatus which prevents the conflict created in performing data transfer operations of shared data structure and which improves overall system performance.

BRIEF SUMMARY OF THE INVENTION

A method and an apparatus for hardware and software interaction in data transfers of shared data structures in memory are disclosed. More specifically, the method and apparatus of the present invention decreases the number of mutex lockings required to prevent conflict between different software attempting to access the same data and keeps the index value for each buffer in use in order to prevent conflicts between buffer replacement and packet arrival.

In an exemplary implementation of the method and apparatus of the present invention, a receive hardware of a computer system keeps an index value for each buffer in use. This index value is placed in a completion ring protected by mutex, and placed in a software queue protected by the same. The mutexes assure that only one thread will possess a given index at a given time.

With the present invention, no mutex locking is required for a buffer table containing software addresses and related information. This is because the hardware keeps the index value for each buffer in use in order to prevent conflicts between buffer replacement and packet arrival. In addition, a buffer's index value allows faster lookup of software addresses and related information in the buffer table since no hashing and searching are required. Further, the present invention does not require any I/O addresses to be stored in the buffer memory in order for the software address and related information to be retrieved from the buffer table. Thus, not only does the method and apparatus of the present invention use less memory than the prior art, the present invention also decreases the number of mutex lockings necessary and dispenses with the need for hashing and searching the buffer table during data transfer operations involving shared data structures.

BRIEF DESCRIPTION OF THE DRAWINGS

The features and advantages of the present invention will become apparent from the following detailed description of the present invention in which.

DETAILED DESCRIPTION OF THE INVENTION

A method and an apparatus related to shared data structures in memory in which the hardware keeps the index value for each buffer in use in order to prevent conflicts between buffer replacement and packet arrival, are disclosed.

Figure 1:
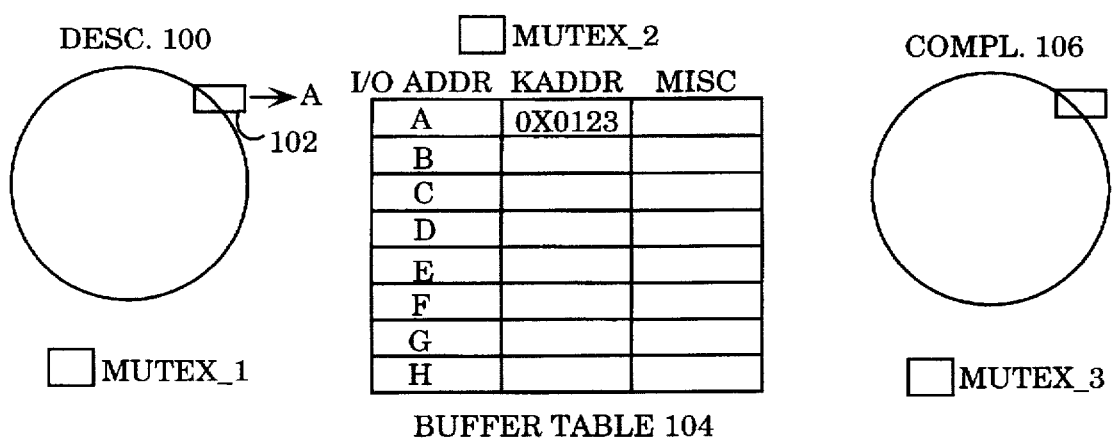
FIG. 1 illustrates a prior art method.
Figure 2:
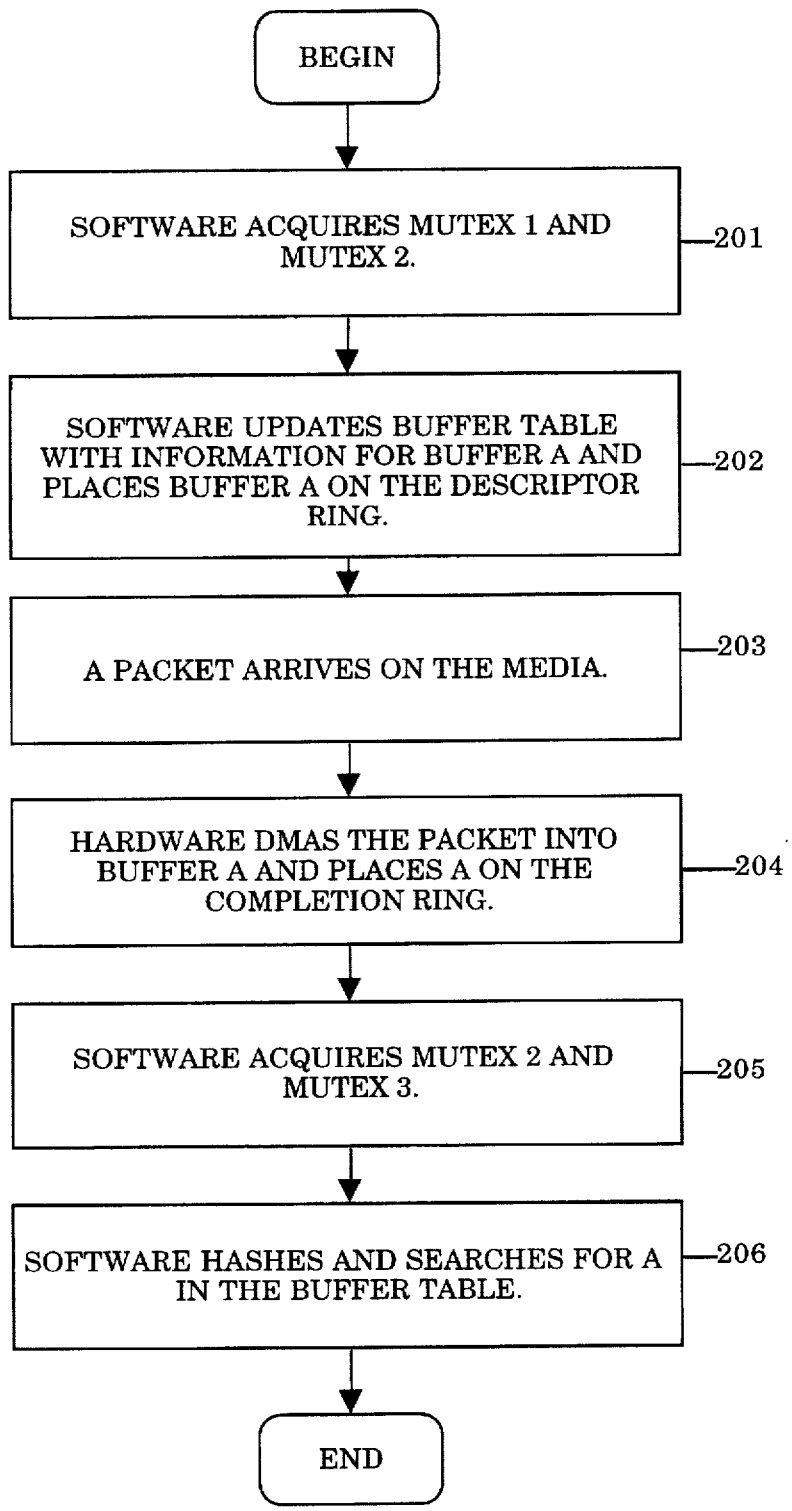
FIG. 2 is a flow diagram illustrating the general steps which may be followed by a prior art method and apparatus for data transfers for shared data structures.
Figure 3:
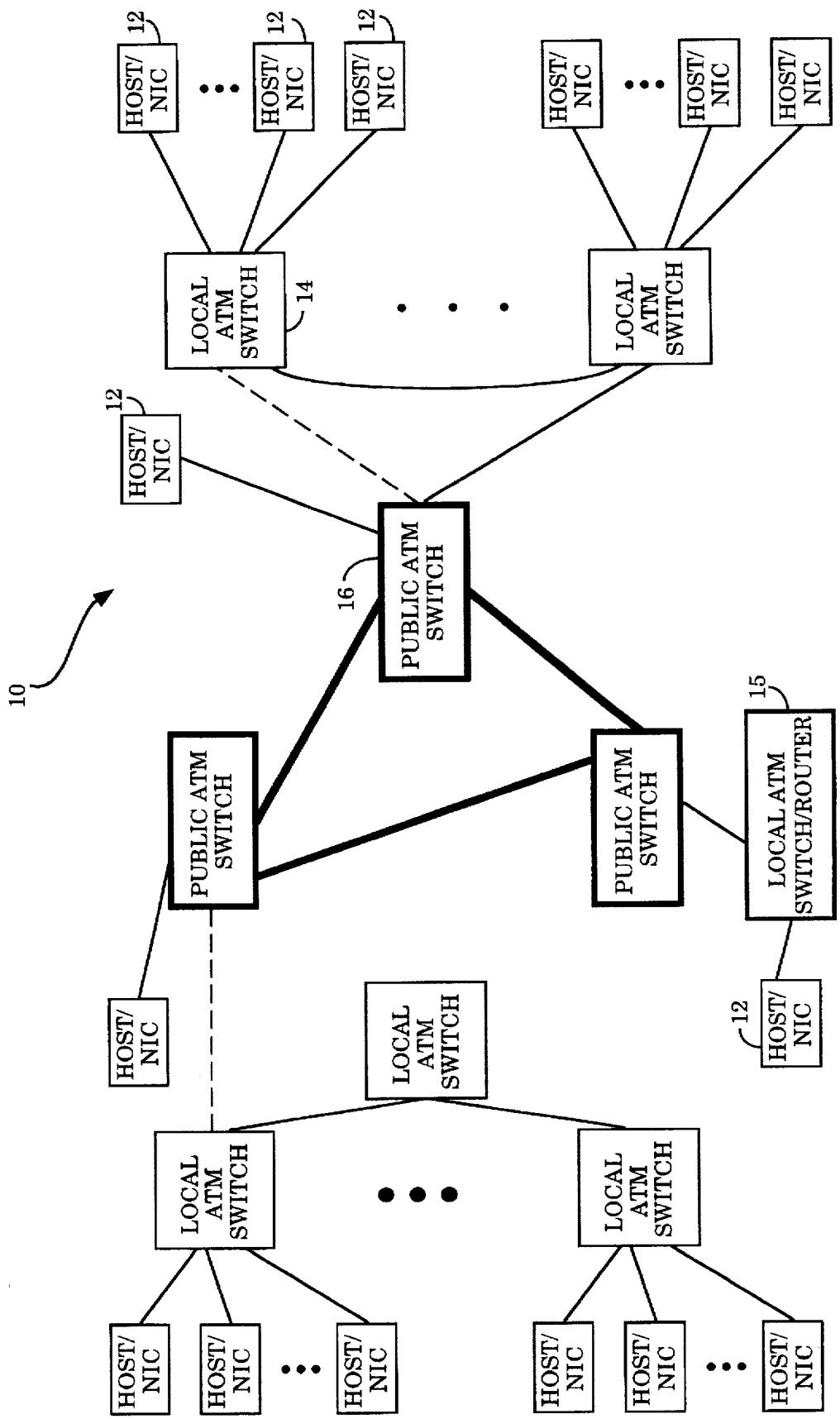
FIG. 3 illustrates an exemplary computer system network with which the present invention may be implemented.

FIG. 3 illustrates an exemplary computer system network incorporating the ATM (Asynchronous Transfer Method) network interface circuit which utilizes the method and apparatus of data transfer coordination of the present invention. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 3, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 4:
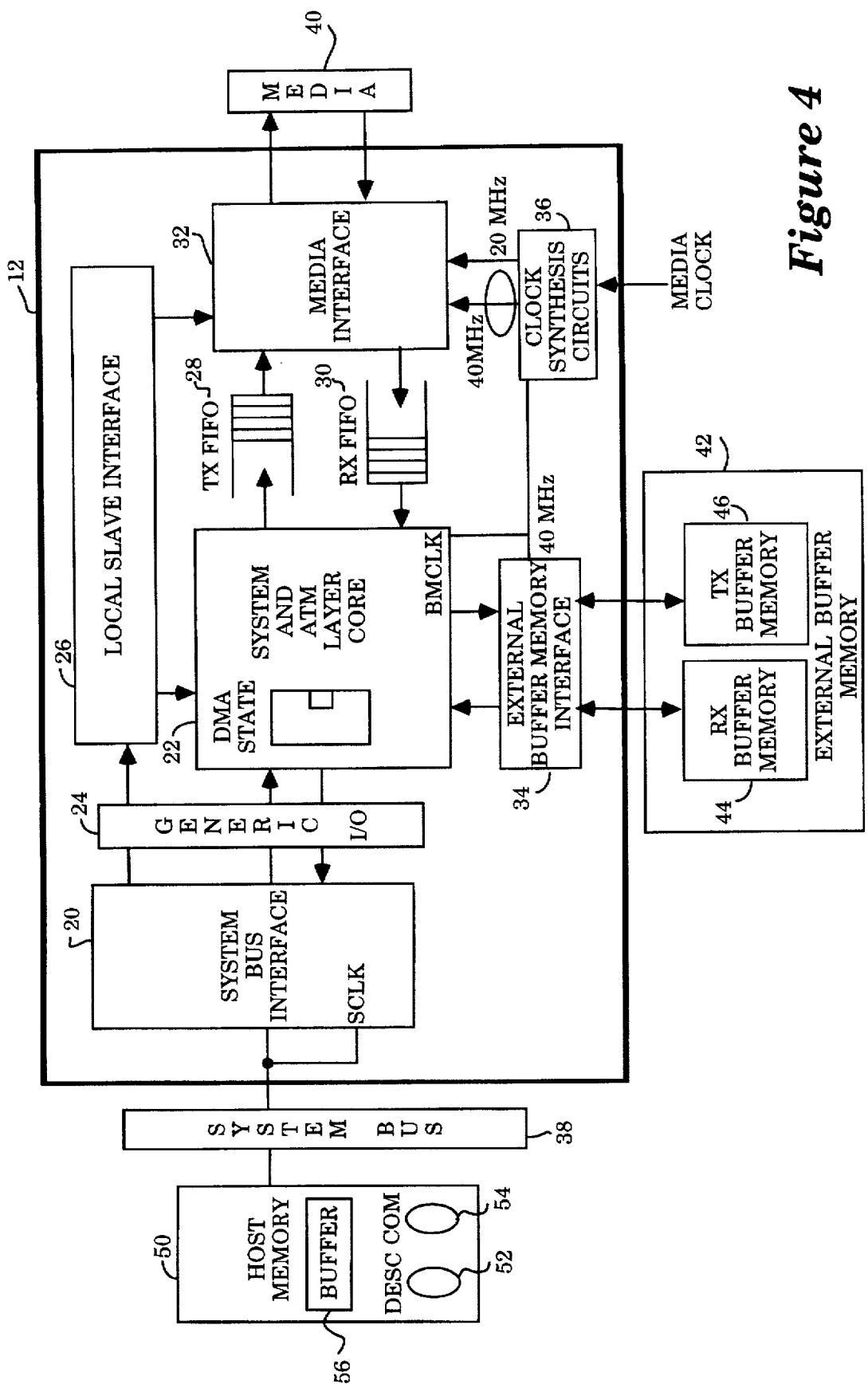
FIG. 4 is a simplified system diagram illustrating the architecture of the ATM NIC 12 of FIG. 3.

FIG. 4 is a simplified system diagram illustrating the architecture of the ATM NIC 12 of FIG. 3. The ATM NIC 12 interfaces the host computer system coupled through system bus 38 to the network media 40 operating in accordance with the ATM protocol.

The ATM NIC 12 shown includes a System Bus interface 20, a Generic Input/Output ("GIO") interface 24, a System and ATM Layer Core 22, a Local Slave interface 26, an array of transmit (TX) FIFOS 28, an array of receive (RX) FIFOS 30, a Media interface 32, an External Buffer Memory Interface 34 and clock synthesis circuit 36.

Together, the elements 20–36 of network interface circuit 12 cooperate to asynchronously transfer data between the host computer and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system. In a preferred embodiment, multiple transmit and receive channels are serviced as virtual connections utilizing a full duplex 155/622 Mbps physical link. Multiple packets of data, subscribed to different channels over the System Bus 38 to the external buffer memory 42, via the External Buffer Memory Interface 34, are segmented by the System and ATM Layer Core 22 into transmit cells for transmission to the Media 40 through Media interface 32.

External buffer memory 42 has RX buffer memory 44 containing RX data buffers. The RX data buffers are primarily used for buffering incoming cells. In an exemplary embodiment, part of the buffer memory is also used to hold information for 1024 receive channels out of which 128 are cached internal to NIC 12. The data buffer memory is organized as a collection of forty-eight byte buckets. Each bucket holds the payload of an ATM cell. The data buffer memory is a shared memory pool whose forty-eight byte bucket will be assigned dynamically to tile incoming cells for different channels. The dynamic bucket allocation assigns free buckets to the channels according to their needs mad memory is fully utilized. In the extreme case, one channel can occupy all buckets in the memory pool or buckets may be assigned to many channels with close to perfect interleave cells.

The Core 22 also comprises reassembly logic to facilitate reassembly of the receive packets. The TX and RX FIFOS 28, 30, coupled between the Core 22 and the Media Interface 32, are used to stage the transmit and receive cell payloads of the transmit and receive packets respectively. The Media Interface 32 transmits and receives cells to the Media 40 of the network, driven by clock signals prodded by Clock Synthesis Circuit 36. Preferably the Media, and therefore the Media interface 32, conforms to the Universal Test and Operations Physical Interface for ATM ("UTOPIA") standard, as provided by the ATM Forum Ad Hoc specification. To conform to the UTOPIA specification, the clock synthesis circuit 36 provides either a clock signal of 20 MHz or 40 MHz to enable the Media interface 32 to support a byte stream at 20 MHz for 155 Mbps or a 16 bit stream at 40 MHz for a 622 Mbps data stream.

In the present embodiment, the Media Interface 32 receives 52-byte data cells each having a 4-byte cell header and a 48-byte payload from the TX FIFO 28. The Media Interface 32 inserts a checksum as a fifth byte to the cell header into each cell prior to providing the 53-byte data cell to the Media 40. Conversely, when the Media Interface 32 receives cells from the Media 40, it examines the checksum in the fifth byte of each cell to determine if the checksum is correct. If so, the byte representing the checksum is stripped from the cell and the cell is forwarded to the RX FIFO 30. Otherwise, the entire cell is dropped.

The network interface circuit 12 also shields the cell delineation details of asynchronous transfer from the applications running on the host computer system. For present purposes, it is assumed that applications running on the host computer system manage transmit and receive data using wrap around transmit and receive rings with packet interfaces. However, the present invention may be practiced with the applications running on the host computer system managing transmit and receive data using other data structures.

The System Bus Interface 20 and Generic I/O interface 24 insulate the host computer system from the specifics of the transfer to the Media 40. Furthermore, the Core 22 is insulated from the specifics of the system bus 38 and host data structure. In the present preferred embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus.

It is contemplated that the System Bus Interface 20 can be configured to conform to different host computer system busses. The System Bus Interface 20 is also configured to transfer and receive data in accordance with the protocols specified by the Generic I/O interface 24. The Generic I/O interface 24 provides a singular interface through which the Core 22 communicates with the host computer. Thus, the (Core 22 does not change for different embodiments of the NIC 12 which interface to different host computer systems and busses.

The implementation of the present invention's method and apparatus for data transfers of shared data structures may be applied to shared data structures stored in host memory 50. Host memory 50 is coupled to system bus 38. Descriptor ring 52 and completion ring 54 are both in host memory 50. Data may be direct memory accessed from host memory 50 to network interface circuit 12. When network interface circuit 12 begins receiving packets through media 40, packet flows through media interface 32, through system core 22 and into external buffer memory 42. The packet is then transmitted back into network interface circuit 12 through system core 22 into host memory 50. The hardware acknowledges the received packet and reads from descriptor ring 52. Once the hardware has the DMA state, it begins to move the data in the packet into buffer 56 and places the DMA state back on completion ring 54. A more detailed description of this process is described in the following.

Figure 5:
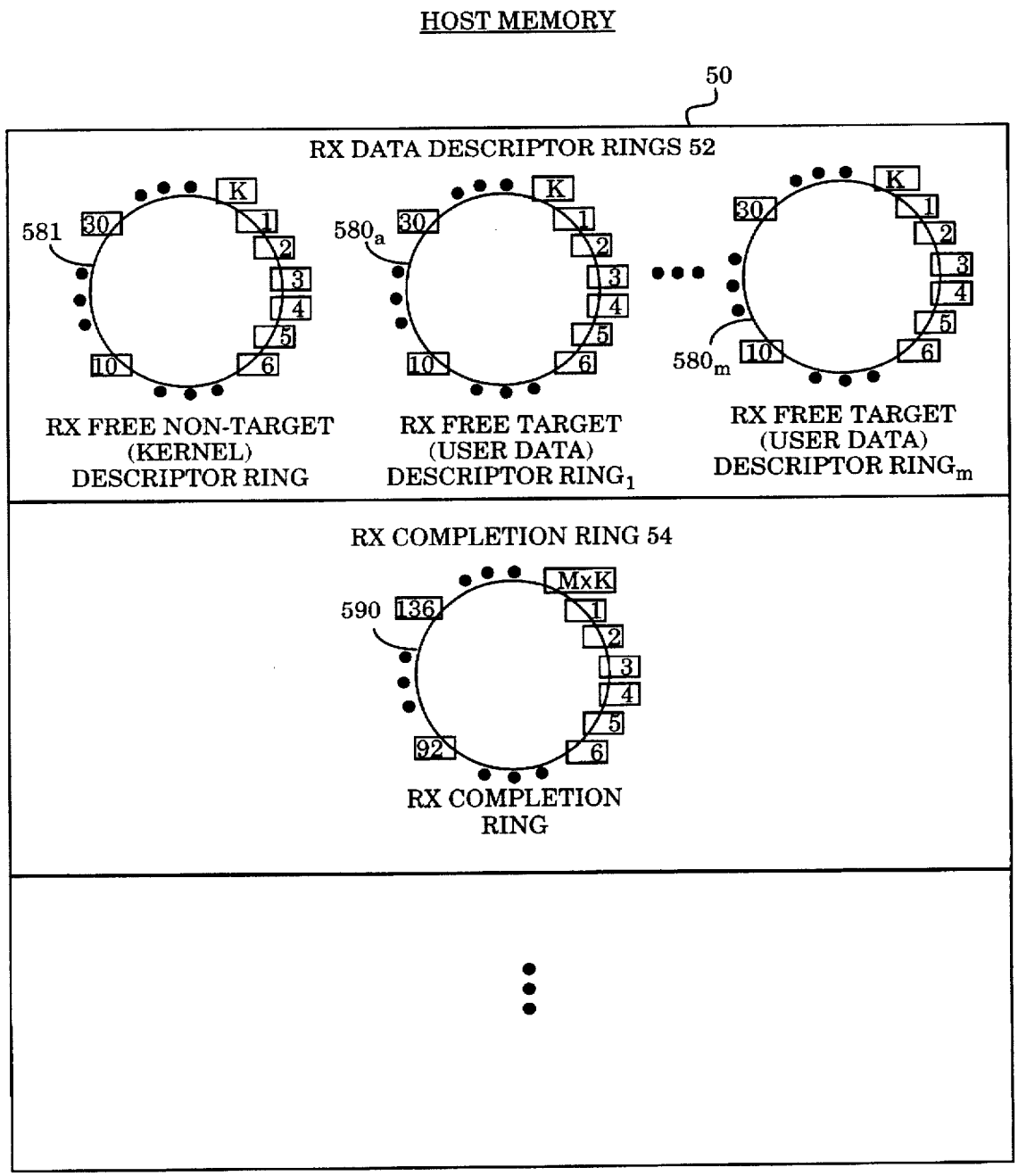
FIG. 5 is a general overview of the preferred data structure of the host memory used for data transmission.

FIG. 5 is a general overview of the preferred data structure of the host memory used for data reception. The host memory includes receive ("RX") free target (user data) data descriptor rings 580a–580m, free non-target (kernel) descriptor ring 581 and RX completion ring 590.

RX free target (user data) data descriptor rings 580a–580m and RX free non-target (kernel) descriptor ring 581 are two different types of RX free buffer descriptor rings. Each VC (virtual circuit) subscribes to one of the two types. There is a common free buffer pool which could be utilized by multiple VC's. The second type provides per VC dedicated free buffer pool. The VC subscribing to the common free buffer pool is referred to as non-targeted VC and per VC dedicated free buffer pool is known as targeted VC. The data and protocol header splitting is supported by both targeted and non-targeted VC. Targeted VC's have buffer chaining privilege where the non-targeted VC's do not.

The RX free target (user data) descriptor rings 580a–580m are data structures corresponding in number to the multiple channels, usually of different transfer data rates, supported by the network interface circuit (NIC) and to the RX data buffers, respectively. Each RX data descriptor ring 580a–580m includes a plurality "K" of ring entries 585, numbered "1" to "K", which are accessed by software sequentially and in a circular fashion. The value of "K" is a whole number preferably at least equal to sixty-four. Each ring entry is of a sufficient size (e.g., 64 bytes) to provide storage for a "data descriptor" which includes at least one pointer to a location in its respective RX data buffer where a desired data packet is located. Thus each receive channel programmed as a target channel would have its own free buffer ring. There will be up to 1,024 free buffer rings for up to 1,024 target connections. When a particular channel runs out of free buffer and a packet arrives, the hardware will access the common free buffer pool to retrieve a free buffer. Free target data ring uses "OWN" bit for descriptor ownership.

There is one common RX free data ring 581 primarily to store packets for multiple receive channels which have been programmed as non-target channels. Non-target channels are normally utilized for packets destined to kernel space such as NFS (network file system). RX free non-target descriptor ring 581 may also be utilized as an auxiliary buffer pool when the individual target channels (channels which are tied directly to user application) run out of free buffers. In an exemplary embodiment, there are two buffer pointer entries per descriptor. One buffer pointer is utilized to store the protocol header and the other for the data portion of the packet. The header buffers and data buffers are limited to 2048 bytes and 64 k bytes respectively. RX free non-target data ring 581 utilizes an "OWN" bit for descriptor ownership.

RX completion ring 590 is a data structure having a plurality of ring entries which, unlike RX data descriptor rings 580a–580m, contain all necessary information in the ring entry rather than relying on pointers. The received data packets for multiple channels are reported in a single RX completion ring 590 both for targeted and non-targeted VC's. In a preferred embodiment, the RX completion ring 590 occupies 64 k bytes of host memory through 1,024 ring entries being on 64 byte boundaries. The RX completion ring 590 is accessible by both software and hardware requiring an OWN bit in each descriptor which is set when the NIC has ownership of the RX completion ring 590.

Figure 6:
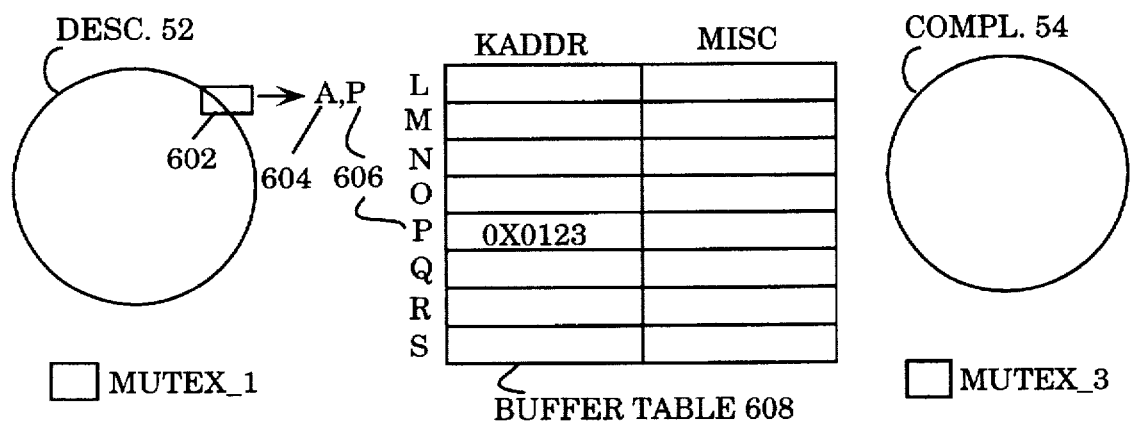
FIG. 6 illustrates the method and apparatus for improving overall performance when making buffers available to hardware by decreasing the number of mutexes required.

FIG. 6 illustrates the method and apparatus for improving overall system performance in data transfers by decreasing the number of mutexes required of the software accessing shared data structures. In the exemplary implementation of the present invention, descriptor ring 52 has a descriptor 602 for buffer A 604 with index P 606. Index 606 for buffer A 602 is P, and the corresponding entry listing the address of buffer A in buffer table 608 may be found in entry P being pointed to by descriptor 602 for buffer A 604. Once the software makes buffer A 604 available on descriptor ring 52, the hardware may retrieve such buffer. When the hardware has completed using buffer 604 by, for example, inserting a packet in buffer 604, it places the buffer on completion ring 54. When buffer 604 is being placed on descriptor ring 52 by the software, mutex 1 assures that no other software application is attempting to place a buffer at the same address of descriptor ring 52. A mutex as referred herein is identical to the mutex discussed in the Background Section so no further discussion is necessary.

Because the descriptor has index value 606 pointing to buffer A 604, indicating the exact location of buffer A 604's entry in buffer table 608, there is no need for mutex locking on buffer table 608. More specifically, buffer table 608 does not need to be hashed or searched in order to find buffer A 604 since index P indicates the location of the entry containing the addressing information for buffer A 604. In addition, because of mutex 1, it is assured that only one software is using index P 606 and no mutex locking is required for buffer table 608.

Figure 7:
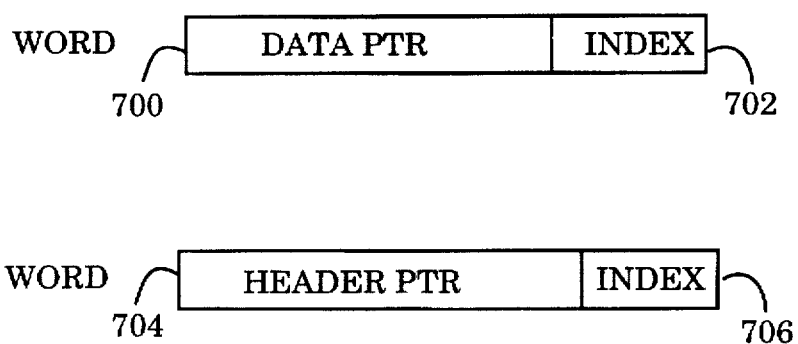
FIG. 7 illustrates the method and apparatus for regulating shared data structures.

FIG. 7 illustrates exemplary pointers which may be used in the implementation of the present invention. Both word 700 and word 704 have an index value indicating the entry of the buffer in the buffer table in order to prevent conflicts between buffer replacement and packet arrival. Exemplary word 700 has index 702 and word 704 has the remaining portion of index 702.

Figure 8:
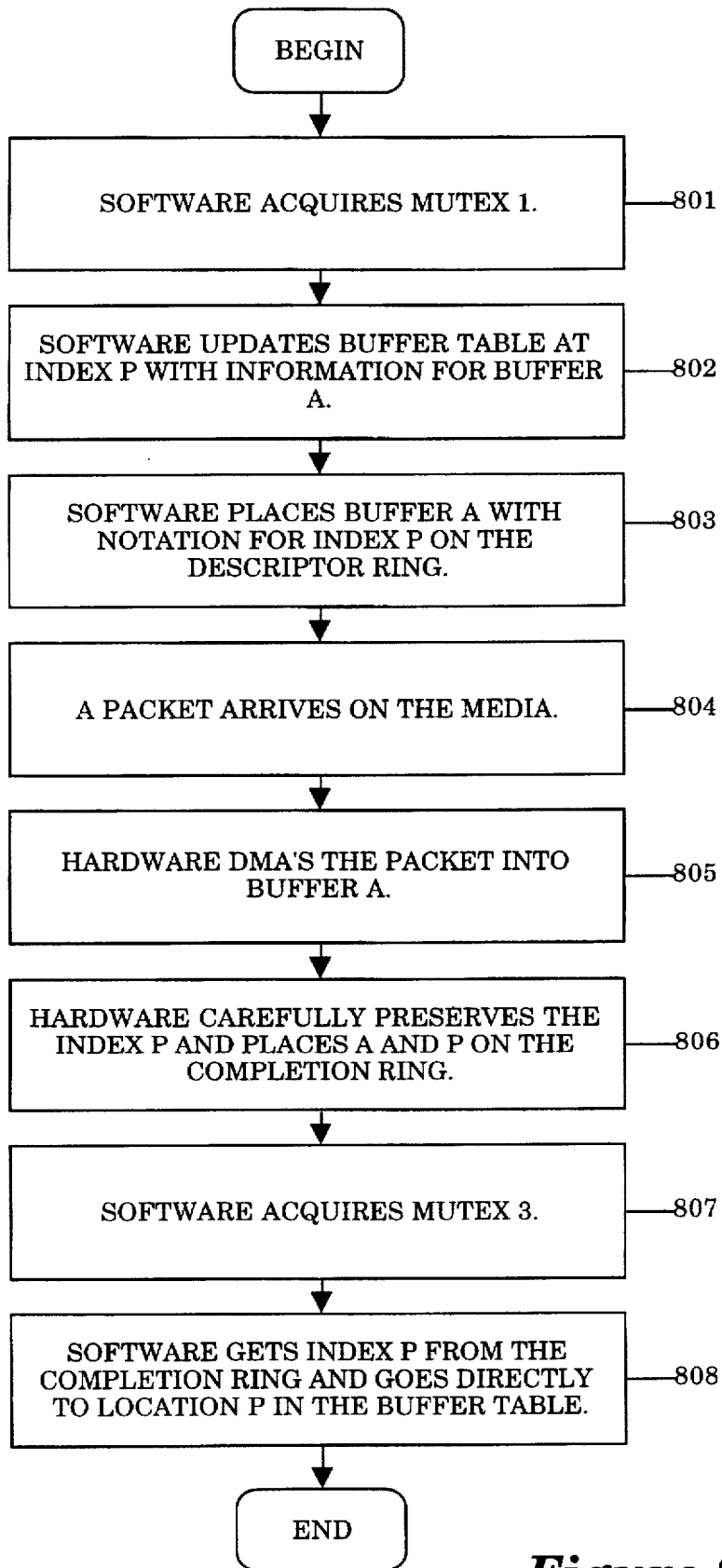
FIG. 8 is a flow diagram illustrating the general steps followed by an exemplary implementation of the present invention.

FIG. 8 is a flow diagram illustrating the general steps followed in an exemplary implementation of the present invention. Referring back to the components illustrated in FIG. 6, in step 801, software acquires mutex 1 for mutex locking descriptor ring 600. In step 802, software updates buffer table 608 at index P 606 with information for butler A 604. In step 803, software places descriptor 602 on descriptor ring 600 with index P 608 indicating the location of buffer A 604 information in buffer table 608.

In step 804, a packet arrives on media 40. In step 805, hardware DMA's the packet into buffer A 604. In step 806, hardware carefully preserves index value P 606 stored in the descriptor 602 pointing to buffer A 604. In step 807, software acquires a mutex 3 from mutex locking completion ring 610. Software then retrieves index P 606 from completion ring 610 in step 808 and proceeds directly to location P in buffer table 608.

With the method and apparatus of the present invention, no mutex locking for buffer table 608 is necessary as long as index 606 is "owned" by the software. In addition, with the present invention, the buffer replacement and packet arrival do not conflict as they did for the method and apparatus of the prior art.

What has been described is a method and an apparatus for keeping an index value for each buffer in use and decreasing the number of mutex lockings necessary during a data transfer of shared data structures.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

More specifically, the method and apparatus of the present invention is not limited to the implementation with the ATM illustrated in FIGS. 3 and 4. The specific implementation illustrated in the figures are for exemplary purposes only. The present invention may be implemented in any framework requiring mutex lockings during access to shared data structures.

What is claimed:

1. A method for providing any one of a plurality of software applications exclusive access to a shared data structure in host memory, said method comprising the steps of:

saving an index value for each buffer in use in a corresponding descriptor pointing to each said buffer in use within said shared data structure, each said saved index value referencing an entry in a buffer table, said buffer table having the kernel address of each said buffer in use; and retrieving said index value for one of said each buffer in use, said index value for use only by one of the any one of a plurality of software applications to exclusively access the kernel address of said one of said each buffer in use in said buffer table.

2. The method of claim 1 wherein said step of referencing further comprises the steps of acquiring a first mutex for a descriptor ring in said kernel.

3. The method of claim 2 further comprising the step of updating said buffer table at said index value with information for said buffer.

4. The method of claim 3 further comprising the step of placing said descriptor with pointer to said index value on a descriptor ring of said kernel.

5. The method of claim 4 further comprising the step of direct memory accessing an incoming packet into said buffer, said direct memory accessing being performed by hardware.

6. The method of claim 5 further comprising the step of placing said descriptor with said pointer to said index value on a completion ring of said kernel.

7. The method of claim 6 further comprising the step of acquiring a second mutex for said completion ring.

8. The method of claim 7 further comprising the step of retrieving said index value from said completion ring and locating said kernel address of said buffer in said buffer table using said index value.

9. An apparatus for providing exclusive access to a shared data structure in host memory comprising:

a buffer table containing a kernel address for each buffer in use within the shared data structure, the data structure having at least one descriptor ring with a plurality of buffer descriptors, each buffer descriptor pointing to a respective buffer in use;

each said buffer descriptor having an index value referencing an entry in said buffer table, said index value for use by only one of a plurality of software applications to exclusively access a corresponding said buffer in use.

10. The apparatus of claim 9 wherein said shared data structures comprises at least one completion ring.

11. A computer system for providing exclusive access to a shared data structure in host memory comprising:

the host memory having,
the shared data structures holding a plurality of buffers,
a buffer table containing a kernel address for each buffer in use within the shared data structure, the data structure having at least one descriptor ring with a plurality of buffer descriptors, each buffer descriptor pointing to a respective buffer in use,
each said buffer descriptor having an index value referencing an entry in said buffer table, said index value for use by only one of a plurality of software applications to exclusively access a corresponding said buffer in use a processor for processing data in said shared data structures.

12. The system of claim 11 wherein said shared data structures comprises at least one completion ring.

* * * * *